July 5, 1966  H. FERNHOLZ  3,259,765
AUTOMATIC CONTROL CIRCUIT FOR THE WORKING CYCLES OF A MACHINE
Filed May 16, 1963
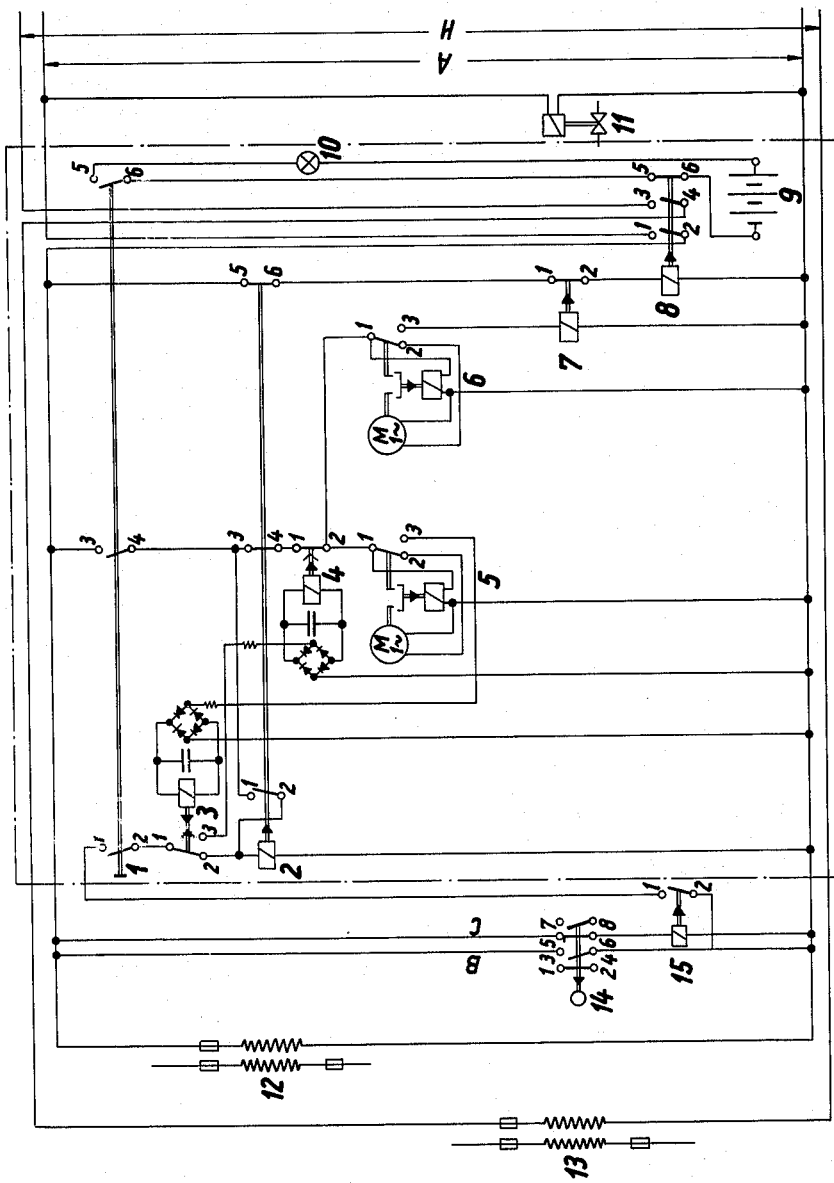
Inventor:
HELMUT FERNHOLZ
By Irwin J. Thompson
ATTY.

United States Patent Office 3,259,765
Patented July 5, 1966

3,259,765
AUTOMATIC CONTROL CIRCUIT FOR THE WORKING CYCLES OF A MACHINE
Helmut Fernholz, Meinerzhagen, Westphalia, Germany, assignor to Werner Battenfeld, trading as Gebr. Battenfeld, Meinerzhagen, Westphalia, Germany
Filed May 16, 1963, Ser. No. 280,951
Claims priority, application Germany, June 1, 1962, B 67,495
7 Claims. (Cl. 307—141.4)

This invention relates to a method of supervising the working cycle proceeding automatically by means of a pre-set course of automatic injection moulding, pressing or blowing machines for working plastics.

Automatic machines for working plastics manufacture the particular finished article in question in one working cycle from plastic material in granulated form, several different working operations needing to be carried out one after the other in this working cycle, such as the heating of the granulated plastic material, the injection of the plasticized material into the necessary mould, the forming of the article in the mould and the ejection of the finished product from the mould. The driving members of the automatic machine must for the carrying out of such a working cycle be actuated in varying order and time sequence depending on the particular type of automatic machine and on the particular article to be manufactured. Such actuation of the automatic machine for the carrying out of one working cycle can in the interests of automation of manufacture proceed in a self-acting manner, that is to say without the presence of operating personnel. For this purpose the automatic machine is provided with a pre-set course or programme, which is adapted to the form of machine in question and to the form of the particular article to be manufactured, and which controls the actuation of the driving members of the automatic machine.

For the supervision of such automatic machines for working plastics, equipped with pre-set programme, it is known to use so-called failure and tool safety devices, which supervise the automatic machine through the moulded product being discharged and which protect the machine and the tool from damage by seized parts. In the known failure safety devices the beginning of the closing movement of the injection mould is prevented until the finished part being discharged from the mould has actuated the contacts of the stoppage safety device. If the contacts are not actuated, then the finished part has not left the mould. In this case renewed closing of the mould is prevented in order to prevent damage of the automatic machine by the jammed finished part. The known tool safety device likewise prevents closing of the mould if a foreign body is located between the halves of the mould.

The known safety devices thus prevent damage to the automatic machine when the finished part has not been satisfactorily ejected from the mould or when the injection mould is not ready to accommodate a new part to be formed, but they do not exclude damage to the machine in the case of disturbances which do not derive their cause from the article to be manufactured. In spite of the known safety devices, therefore, constant supervision of the automatic machine by the operating personnel is necessary, if disturbance-free functioning is to be ensured and if damage to the automatic machine is to be prevented when disturbances do occur.

Such possible disturbances may have many causes; for example they may be caused because the entire power supply from the mains has temporarily failed. Furthermore wear may occur on the machine itself, for example a heating strip may burn out and interrupt the plasticising of the mass. A further disturbance may occur when there is unfavourable granulated material in the feed device for the raw material. Finally the supply of cooling water or compressed air may be wholly or partly interrupted. If such disturbances are not remedied within a short time, serious damage to the automatic machine may occur which would render necessary partial dismantling of the automatic machine and thus result in the machine being out of action for a long time until they were put right. For example, in an injection moulding machine the material in the injection cylinder may become burnt through continuous heat action and thus render necessary dismantling of the plasticising cylinder.

The applicants have recognized that damage to the automatic machine resulting from more or less any type of disturbance can be reliably avoided, if the working cycle of the automatic machine is controlled. Any disturbance occurring results in a change in time in the next working cycle. The method according to the invention is characterized by the feature that an electrical impulse is produced at a predetermined constant point in each working cycle, that the time intervals between successive impulses are checked by a time switch set to a minimum time and by a time switch set to a maximum time, and that when the minimum time set is not reached or the maximum time set is reached, the automatic machine is brought to a standstill, whilst when the minimum time is reached and the maximum time is not reached, the time switches return to their initial position. Thus in the method according to the invention the automatic machine is switched off in the case of shortening or lengthening of the working cycle, the fact of the switching off naturally being able to be made noticeable by a suitable optical or acoustical signal.

The arrangement for carrying the method into effect is characterized by the feature that the separate circuits for the driving and the heating of the automatic machine are taken over separate make contacts of a live main relay and that two rest contacts are arranged in series in the circuit of the main relay and are actuated by a maximum relay and a minimum relay, whereby through the impulse given the maximum relay is excited through a contact of the maximum time switch closing when the maximum time is exceeded and the minimum relay is excited through the rest contact of a relay switched on when the minimum time is reached by the minimum time switch.

As a further development of the invention a hand switch is provided, which renders live the impulse circuit through its make contact, the circuit for the time switches through its make contact and a signalling circuit through its make contact.

A further feature of the invention consists in that to produce an impulse, a limit switch mechanically operated by the programme control and having two contacts overlapping in time sequence is used, the contacts controlling an impulse relay which through its make contact passes the impulse to the impulse circuit.

The invention is furthermore characterized by the feature that the relay of the time switches has a switching contact, which in the rest position closes the circuit of the minimum relay and in its make position switches off the minimum relay and switches on a reflux relay which breaks the circuit of the time switches and thereby releases the reflux.

The method is further characterized by the feature that the minimum relay has a holding contact, a rest contact located in the circuit of the time switches and a rest contact located in the circuit of the main relay.

A further feature of the invention is characterized by the fact that the reflux relay and the relay of the time switches are each provided with a breaking delay.

Finally the invention is characterized by the fact that the main relay has an additional rest contact, which is located in a signalling circuit supplied, for example, by a battery.

The accompanying drawing shows one embodiment by way of example of an arrangement working by the method according to the invention.

The automatic machine is run in the open position of the hand switch 1, that is to say with the contacts 1, 2, 3, 4 and 5, 6 open. The relays 2 and 7 remain in the rest position and switch on the relay 8 by way of the associated contacts 5, 6 and 1, 2. The control transformers 12, 13 supply the control circuit for driving and heating by way of the contacts 1, 2 and 3, 4 of the relay 8. The magnetic valve 11 opens the cooling water supply line as it is connected to the control voltage for the drive.

The circuit from the battery 9 for the warning lamp 10 is broken by the contacts 5, 6 of the relay 8 and the contacts 5, 6 of the switch 1. The exciter current for the time switches 5, 6 is switched off by the open contact 3, 4 of the switch 1 and the impulse circuit is switched off by the open contact 1, 2 of the switch 1. The impulses are given by the combination of the relay 15 for the injection piston "forward" and the limit switch 14 for limiting the injection piston movement in the forward position. For the sake of explanation it should be stated that an alternating current motor is used as drive for the "forward" and "backward" movements of the injection piston, which motor is set in left-hand or right-hand motion by the programme control of the automatic machine by means of a reversing switch and is switched off by a limit switch in each case after the injection piston stroke in the forward or backward position has been completed. In the accompanying drawings the limit switch for stopping the injection piston movement in the forward position is designated 14 and the switch injection piston "forward" from the reversing switch injection side is designated 15. The limit switch 14 also takes over the excitation of a time switch for the back pressure, which in turn lets the injection piston run back after the set time has elapsed. As soon as injection has taken place, the terminal 5 of the limit switch 14 is made live by the programme control. The relay 15 for injection piston "forward" is switched on and closes its contact 1, 2. The terminal 3 of the limit switch 14 is likewise made live by the programme control. If the limit switch 14 is now actuated through the injection piston travelling forward, the contact 3, 4 first closes and thereby excites the time switch for the back pressure. At the same time the terminal 1 of the switch 1 is made live. On further actuation of the limit switch 14, the contact 5, 6 opens and lets the relay 15 drop, whilst the contact for exciting the back pressure time switch remains closed. The relay 15 opens its contact 1, 3 and thus shuts off the voltage to the terminal 1 of the switch 1. An impulse is thus produced, the length of which corresponds to the time value from closing of the limit switch contact 3, 4 to breaking of the contact 1, 2 of the relay 15. The contact 3, 4 of the limit switch closes during the actuation sooner than the contact 5, 6 opens. As a result the terminal 1 of the switch 1 remains live through the contact 1, 2 of the relay 15 until the contact 5, 6 of the limit switch 14 switches off the relay and thus ends the impulse. The length of the impulse is therefore dependent on the speed of actuation of the limit switch 14 and on the dropping time of the relay 15. The length of impulse is as a rule about 0.5 second.

Before the switch 1 is switched on, the time switch 5 for the minimum time must be set to the minimum value and the time switch 6 to the maximum time value, in order that switching off of the automatic machine is prevented until time values for the working cycle to be controlled have been set. Nevertheless switching off can occur, namely if the switch 1 and hence the supervisory control are switched on when the time switch 5 has not yet reached its minimum value set before the impulse is given. The impulse would in this case excite the relay 2 by way of the contact 1, 2 of the relay 3, the relay 2 in turn bringing about switching off through its contact 5, 6. The switching on of the switch 1 must therefore only take place when the injection piston movement in the forward position is completed and the impulse has thus just been given, then the time switch 5 for the minimum time will have certainly reached its set time value by the next impulse.

The relay 4, when the impulse is given, interrupts the exciter current for the time switch, whereby the latter jumps back to its set value through the return springs tensioned during the excitation. The return time is directly proportional to the time value set and must be identical with or smaller than the breaking time of the contact 1, 2 on the relay 4. In order to fulfill this condition, the relay 4 has a braking delay of approximately 0.5 seconds, which ensures an absolutely satisfactory return even when the time values set are great and the length of impulse small. As soon as the return has taken place, the time switch 5 of the relay 3 becomes dead through the contact 1, 3. The condenser braking delay of 0.5 second prevents the relay 3 from dropping during the impulse and exciting the relay 2 through its contact 1, 2, holding through its contact 1, 2 and carrying out through the contact 5, 6 a switching off of the automatic machine, which in this case would be undesirable.

After the automatic machine is running fully automatically and operation is possible without attendance, the switch 1 is switched on and the control for supervision thereby set in operation. The time switches 5, 6 are excited through their contacts 1, 2 and 3, 4 and through the contact 3, 4 of the relay 2 and the contact 1, 2 of the relay 4. The impulse occurring during one working cycle when the forward position of the injection piston is reached, excites the switch 1 by way of the contact 1, 2 and the relay 4 by way of the contact 1, 3 of the relay 3, whereby the time switches are returned each time. Through the closed contact 5, 6 of the switch 1 the battery 9 can, in the case of failure of the relay 8, leave the warning lamp 10 alight as an indication of stoppage. The time elapsing from impulse to impulse which can be read on the time switch 6 for the maximum time is set on the time switch 6 for the normal time with an addition of about one second and on the time switch 5 for the minimum time with a deduction of about 1 second. With a working cycle proceeding constantly the impulse and hence the return takes place when the time switch 5 has just reached its set value and the time switch 6 has not quite reached its set value, i.e. running through of the automatic machine takes place only when the predetermined minimum time is maintained and the predetermined maximum time is not exceeded.

With this arrangement there are two possibilities of disturbance which must result in switching off of the automatic machine. These possibilities are as follows:

(a) The time of the working cycle is shortened as a result of a disturbance;

(b) The time of the working cycle is lengthened as a result of a disturbance.

In the case of disturbance (a) the working cycle of the automatic machine reaches the point of freeing an impulse sooner than the time switch 5 for the minimum time switches on the relay 3. Therefore through its contact 1, 2, the impulse excites the relay 2. The latter closes its holding contact 1, 2 and opens its contacts 3, 4 and 5, 6. The exciter current for the time switches 5 and 6 is interrupted by the contact 3, 4. The relay 8 is released through the contact 5, 6 and opens its contacts 1, 2 and 3, 4, whereby the control circuits for drive and heating are switched off and the automatic machine stops production. The battery 9 permits lighting of the warning lamp 10 for indication of stoppage through the contact 5, 6 of the relay 8. The valve 11 is dead and thus closes the cooling water supply line. The automatic machine can thus remain stationary, without being damaged, until the operating personnel arrive to put right the disturbance.

In the case of disturbance (b) the time switch 6 for the maximum time reaches the set value and closes its contact 1, 3, whereby the relay 7 is pulled up and its contact 1, 2 switches off the relay 8. As a result the automatic machine is brought to a standstill as already described for (a).

It should further be pointed out that naturally the impulse, instead of in the forward position of the injection piston, can also be given at any desired point of the working cycle. The giving of the impulse, as described, is carried out only because the switching devices belonging to the programme control of the automatic machine have in that case free contacts at their disposal. Moreover the relay 7, which serves for the contact reversal for the contact 1, 3 of the time switch 6, can be replaced by an independent contact on the time switch. For the battery the provision of a continuous charging device is recommended, in order that the battery can bring about a satisfactory indication in the case of switching off of the machine.

The method according to the invention serves mainly for the control of injection moulding machines, presses or automatic blowing machines for working plastics which manufacture whilst unsupervised. It necessitates switching off as soon as a change in the time of the working cycle takes place as a consequence of any kind of disturbance. As, however, the stationary and running times of the driving units belonging to one working cycle determine the number of articles and the parts manufactured, the method can also be used for the supervision of machines of the said type manufacturing whilst attended. The method then results in a switching off or indication of switching off if the operator carries out an unauthorised alteration in the time of the working cycle. Such an alteration may be made by shifting the time switches for the stationary times or by altering the stroke in the gears of the driving units.

The time switches for the minimum and maximum times or for production and stationary times with the relevant switch 1 are accommodated in a housing which can be closed, so that the most favourable values for the article to be manufactured can be set only by an authorised person.

I claim:

1. An arrangement for supervising the automatically operating, pre-set course working cycle of an automatic injection moulding, pressing or blowing machine for working plastics comprising means for producing an electrical impulse at a predetermined constant point in each working cycle, means for checking the time intervals between successive impulses comprising a time switch set to a minimum time and a time switch set to a maximum time, and means for bringing the machine to a standstill when the minimum time set is not reached or when the maximum time set is reached in a working cycle and means for returning the time switches to their initial position when the minimum time is reached and the maximum time is not reached in a working cycle.

2. An arrangement for supervising the automatically operating, pre-set course working cycle of an automatic injection moulding, pressing or blowing machine for working plastics comprising driving and heating circuits for the machine, a live main relay having separate make contacts over which the driving and heating circuits respectively extend, a maximum relay, a minimum relay, two rest contacts in series in the circuit of the main relay and adapted to be actuated by the maximum relay, and the minimum relay respectively, means for producing an electrical impulse at a predetermined constant point in each working cycle, means for checking the time intervals between successive impulses comprising a time switch set to a minimum time and a time switch set to a maximum time, means for energising the maximum relay when the maximum time switch operates as a result of the maximum time being exceeded and relay means for energising the minimum relay when the minimum time is reached by the minimum time switch, said time switches returning to their initial position when the minimum time is reached and the maximum time is not reached.

3. An arrangement as claimed in claim 2, comprising a manual switch, a make contact thereof for energising the means for producing the electrical impulses, a make contact thereof for energising the time switches and a make contact for energising a signalling circuit.

4. An arrangement as claimed in claim 2, comprising a limit switch, an impulse relay supplying the electrical impulse, and two contacts of the limit switch adapted to be operated in overlapping time sequence, said contacts controlling the impulse relay.

5. An arrangement as claimed in claim 2, comprising a return stroke relay which brings about the returning of the time switches to their initial position and said relay having a reversible contact which in the rest position closes the circuit of the minimum relay and in its make position switches off the minimum relay and switches on the return stroke relay.

6. An arrangement as claimed in claim 5, in which the return stroke relay and the relay means each have a release delay.

7. An arrangement as claimed in claim 2, in which the minimum relay has a holding contact, a rest contact controlling the time switches and a rest contact controlling the main relay.

No references cited.

ORIS L. RADER, *Primary Examiner.*

W. SHOOP, *Assistant Examiner.*